United States Patent [19]

Cope

[11] 4,381,589

[45] May 3, 1983

[54] METHOD OF MANUFACTURING A RESILIENT SIDE BEARING

[75] Inventor: Geoffrey W. Cope, Williamsville, N.Y.

[73] Assignee: Dresser Industries, Inc., Dallas, Tex.

[21] Appl. No.: 225,901

[22] Filed: Jan. 19, 1981

[51] Int. Cl.³ .............................................. B21D 53/10
[52] U.S. Cl. ........................... 29/149.5 R; 29/148.4 S; 29/149.5 NM; 29/400 C; 29/527.1; 105/199 CB; 264/DIG. 77; 264/267; 384/423
[58] Field of Search ................ 29/149.5 B, 149.5 NM, 29/149.5 R, 148.4 R, 148.4 S, 402.08, 402.09, 400 C, 527.1, 527.2, 527.3, 156.6; 277/1, DIG. 6, 228, 9.5, 226, 215; 264/318, 308, 242, 256, 241, 259, 267, 264, 268, DIG. 77, 269, 274, 275; 308/138; 105/199 CB

[56] References Cited

U.S. PATENT DOCUMENTS 3,202,749  8/1965  White .......................... 29/149.5 B
3,712,691  1/1973  Cope ................................ 308/138

Primary Examiner—Lowell A. Larson
Assistant Examiner—V. K. Rising
Attorney, Agent, or Firm—Barry E. Deutsch; John N. Hazelwood

[57] ABSTRACT

A method of manufacturing a resilient side bearing of the type utilized between a truck and body of a railway vehicle includes the steps of providing a bearing housing; sealing the bearing housing to form an enclosed bearing chamber, pouring liquid resilient bearing material into the bearing chamber; permitting the liquid resilient bearing material to cure and become bonded to the interior surface of the housing to form the bearing; and removing the seals after the bearing material has cured.

3 Claims, 4 Drawing Figures

METHOD OF MANUFACTURING A RESILIENT SIDE BEARING

BACKGROUND OF THE INVENTION

This invention relates to a method of manufacturing resilient bearings, and in particular, to a method of manufacturing a resilient side bearing of the type utilized between a truck and body of a railway vehicle.

One tried and proven method of combating "hunting" of a railway vehicle is the application of a constant frictional restraint to angular motion of the railway truck at the side bearings thereof. A considerable number of constant contact resilient side bearings have been introduced with varying degrees of success.

An example of a side bearing in accordance with the prior art is illustrated in U.S. Pat. No. 3,712,691 issued in the name of Geoffrey Wilton Cope and assigned to the same assignee as the assignee hereof. It has been found that resilient side bearings of the type disclosed in the above cited patent shift within the bearing housing during operation of the railway vehicle. Such shifting of the resilient bearings, in time, causes the bearings to crack or otherwise rapidly deteriorate. Further, shifting of the resilient bearing within the housing will result in irregular or non-uniform performance from the bearing.

SUMMARY OF THE INVENTION

Accordingly, it is an object of this invention to prevent a resilient side bearing from shifting during operating conditions.

It is a further object of this invention to fully bond a resilient side bearing of a railway vehicle to the bearing housing.

It is yet another object of this invention to obtain a high production rate for molded resilient side bearings without needing molds or similar production equipment.

It is yet another object of this invention to utilize the bearing housing of a resilient side bearing as a mold during the manufacture of the bearing.

These and other objects of the present invention are obtained in a method of manufacturing resilient side bearings of the type utilized between a truck and body of a railway vehicle comprising the steps of providing a bearing housing; sealing the bearing housing to form an enclosed bearing chamber; pouring liquid resilient bearing material into the bearing chamber; permitting the liquid resilient bearing material to cure and become bonded to the interior surface of the housing to form the bearing, and removing the seals after the bearing material has cured.

DESCRIPTION OF THE PREFERRED EMBODIMENT

Figure 1:
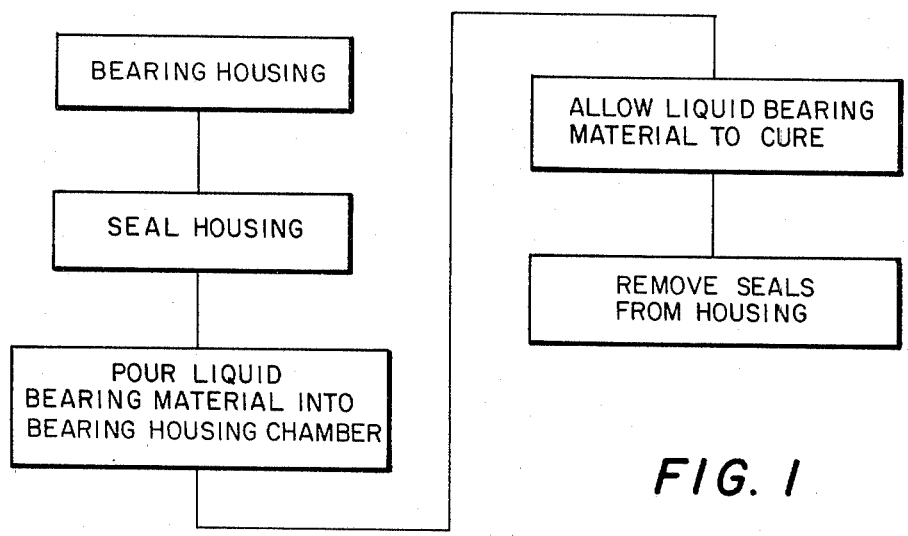
FIG. 1 is a flow chart showing the manner in which the resilient bearing is manufactured in accordance with the present invention.

Referring now to the drawings, there is disclosed a preferred embodiment of the present invention. In particular, and with reference to FIG. 1, there is disclosed a flow diagram illustrating the method of manufacturing the resilient side bearing which is installable between a truck and body of a railway vehicle. Initially, a bearing housing is provided, with the housing comprising pairs of end walls and side walls. Seals are provided about the top surface of the end walls and side walls to form a resilient gasket about the top surface of the bearing housing. Preferably, the seals are made of urethane or similar material that exhibits adequate heat resistant properties. The seals must maintain their integrity during pouring and curing steps used in the process described herein. Further, such seals must retain their resiliency to permit removal after the curing step. A shoe or cap member is clamped or otherwise secured to the top surface of the seals to firmly seal the chamber formed by the bearing housing and shoe. A seal is also provided in an opening formed in the bottom wall of the bearing housing to seal the lower surface of the housing. Preferably the seals are silicon coated.

Liquid bearing material is then poured into the bearing housing chamber preferably through a pouring hole provided in the bearing shoe. The seal provided in the bottom wall of the bearing housing establishes, in combination with the inner surfaces of the housing's walls, the final configuration for the bearing material which in turn defines the operating characteristics of the bearing.

The bearing material is permitted to cure to form a permanent bearing which is bonded to the inner walls of the bearing housing. After the bearing material has fully cured, the seals are removed from the bearing housing to provide the final bearing assembly.

Figure 2:
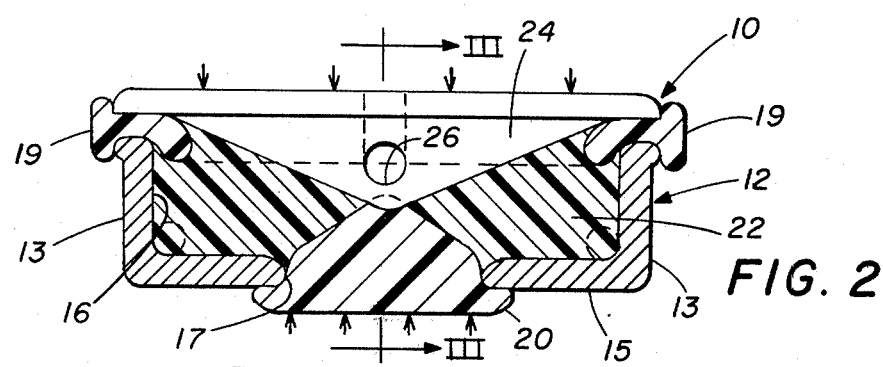
FIG. 2 is a sectional view of the resilient side bearing during the manufacturing process of the present invention.
Figure 3:
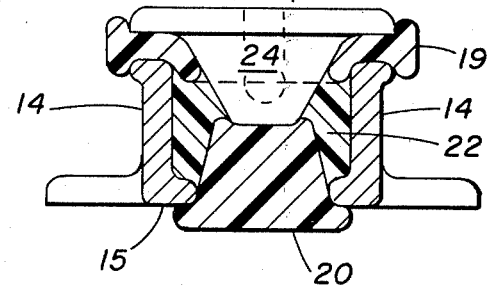
FIG. 3 is a sectional view taken along the lines III—III of FIG. 2 further illustrating the resilient side bearing during the manufacturing process.
Figure 4:
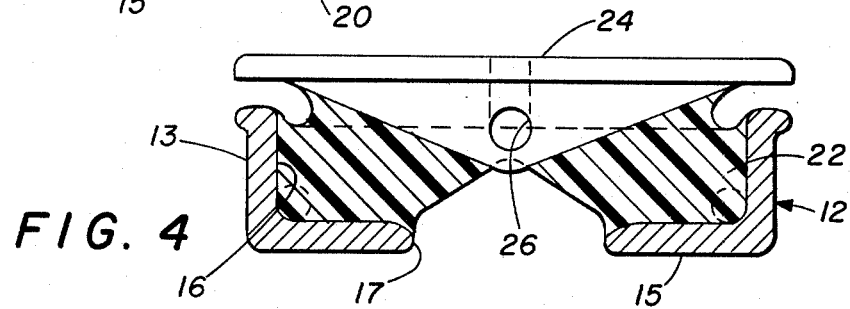
FIG. 4 is a view similar to FIG. 2 illustrating a finished side bearing.

Referring now to FIGS. 2-4, details of the method of manufacturing the side bearing of the present invention shall now be explained more fully. Side bearing 10 is comprised of a base member or housing 12 comprising end walls 13, side walls 14 and lower wall 15. The walls define a bearing chamber 16. It should be noted lower wall 15 includes a space or opening 17 for a reason to be more fully explained hereinafter.

In manufacturing the bearing in accordance with the present method, urethane seals 19 are placed on the top surface of the end walls and side walls in the manner illustrated in FIGS. 2 and 3 to form a resilient gasket-like surface. A shoe or cap member 24 is clamped to the top surface of seals 19 to squeeze the seals between the cap member and the top surface of the end walls and side walls. To completely seal chamber 16, a seal 20 is placed within opening 17 in the bottom wall of the bearing housing. The seal is clamped to the bottom of the bearing housing to completely encapsulate bearing chamber 16.

Resilient bearing material in a liquid state is poured into the bearing housing chamber after the chamber is completely sealed. Preferably, a pouring hole 26 is provided in cap member 24 to enable the bearing material to be readily poured into the chamber. The liquid bearing material is preferably a two component substance, such as urethane, which is both resistant to heat above the processing temperatures and resilient. The resilient bearing material sets chemically or cures to provide a completely bonded resilient bearing within the bearing housing. Lower seal 20 in combination with the inner surfaces of the end walls and side walls respectively 13 and 14 and the inner surface of cap member 24 establish the final configuration of the cured cast bearing 22. In turn, the configuration of the bearing 22 determines its operating characteristics. Thus, by changing the configuration of seal 20, the operating characteristics of the bearing may readily be altered.

After the bearing material has completely cured, seals 19 and 20 are removed from the bearing housing to provide a readily usable resilient side bearing.

Preferably, the outer surfaces of seals 19 and 20 are coated with silicon or a similar substance to prevent the bearing material from adhering to the seals.

By providing a permanently bonded bearing within the bearing housing, the bearing will not shift during operation which will prevent the bearing from cracking. The bearing material is maintained in a permanent location for optimum uniform performance.

The present method utilizes the bearing housing as a mold for forming the permanently bonded bearing. No separate molds are required therefore a high production rate may be achieved at a relatively minimal capital investment.

While a preferred embodiment of the present invention has been described and illustrated, the invention should not be limited thereto, but may be otherwise embodied within the scope of the following claims.

The embodiments of the invention in which an exclusive property or privilege is claimed are defined as follows:

1. A method of manufacturing a resilient side bearing of the type utilized in the truck and body of a railway vehicle comprising the steps of:
    providing the bearing housing;
    deformably sealing the bearing housing to form an enclosed bearing chamber;
    pouring a liquid resilient bearing material into the bearing chamber;
    permitting the liquid resilient bearing material to cure and become bonded to the interior surface of the housing to form the bearing; and
    removing the deformable seals after the bearing material has cured.

2. A method in accordance with claim 1 wherein the sealing step includes:
    placing preformed and deformable seals at predetermined locations within the bearing housing to form the ultimate configuration of the bearing for determining its operating characteristics.

3. A method in accordance with claim 2 further including the step of:
    coating the seals to prevent the resilient bearing material from adhering to the seals.

* * * * *